US011128041B2

(12) United States Patent
Luna et al.

(10) Patent No.: US 11,128,041 B2
(45) Date of Patent: Sep. 21, 2021

(54) ANTENNA SYSTEM WITH A BEAMFORMING DATA MODULATOR

(71) Applicant: VIASAT, INC., Carlsbad, CA (US)

(72) Inventors: Joseph Luna, Carlsbad, CA (US); Ashitkumar Tripathi, Carlsbad, CA (US); Jaymin Patel, Carlsbad, CA (US); Chi Wang Shum, Carlsbad, CA (US)

(73) Assignee: VIASAT, INC., Carlsbad, CA (US)

( * ) Notice: Subject to any disclaimer, the term of this patent is extended or adjusted under 35 U.S.C. 154(b) by 56 days.

(21) Appl. No.: 16/613,291

(22) PCT Filed: May 18, 2018

(86) PCT No.: PCT/US2018/033444
§ 371 (c)(1),
(2) Date: Nov. 13, 2019

(87) PCT Pub. No.: WO2018/213738
PCT Pub. Date: Nov. 22, 2018

(65) Prior Publication Data
US 2020/0203826 A1 Jun. 25, 2020

Related U.S. Application Data

(60) Provisional application No. 62/507,948, filed on May 18, 2017.

(51) Int. Cl.
*H01Q 3/28* (2006.01)
*H01Q 3/36* (2006.01)
*H04B 7/06* (2006.01)

(52) U.S. Cl.
CPC ............... *H01Q 3/28* (2013.01); *H01Q 3/36* (2013.01); *H04B 7/0617* (2013.01)

(58) Field of Classification Search
CPC ........... H01Q 3/28; H01Q 3/36; H04B 7/0617
(Continued)

(56) References Cited

U.S. PATENT DOCUMENTS 6,535,165 B2 3/2003 Stephens
6,778,138 B2 8/2004 Purdy et al.
(Continued)

OTHER PUBLICATIONS

International Search Report from corresponding PCT/US2018/033444 dated Sep. 6, 2018.
(Continued)

*Primary Examiner* — Fitwi Y Hailegiorgis
(74) *Attorney, Agent, or Firm* — Tarolli, Sundheim, Covell & Tummino LLP

(57) ABSTRACT

One example includes a phased array antenna system. The system includes a beamforming network to receive a beam signal to generate a plurality of element signals, each being provided to a respective one of a plurality of antenna elements. The system also includes a plurality of modulation controllers, each associated with a respective one of the plurality of antenna elements. Each of the modulation controllers can generate a beam code in response to a beamforming signal and a data code in response to a data signal. The system further includes a plurality of element adjustment circuits, each associated with a respective one of the plurality of antenna elements. Each of the plurality of element adjustment circuits can modulate the beam code and the data code onto a respective one of the plurality of element signals to generate a respective adjusted element signal that is provided to a respective radiating element.

24 Claims, 3 Drawing Sheets

(58) Field of Classification Search
USPC .................................. 375/316, 267; 342/372
See application file for complete search history.

(56) References Cited

U.S. PATENT DOCUMENTS

| | | |
|---|---|---|
| 7,345,629 B2 | 3/2008 | Dulmovits, Jr. et al. |
| 7,714,775 B2 | 5/2010 | Navarro et al. |
| 8,098,198 B2 | 1/2012 | Thiesen et al. |
| 8,457,251 B2 | 6/2013 | Uhl et al. |
| 9,172,569 B2 | 10/2015 | Leenaerts et al. |
| 9,479,232 B1 | 10/2016 | Loui et al. |
| 10,666,348 B1 * | 5/2020 | Legare .................. H04B 7/0885 |
| 10,897,082 B1 * | 1/2021 | Legare .................. H01Q 3/2694 |
| 2002/0103013 A1 | 8/2002 | Watson et al. |
| 2009/0231197 A1 | 9/2009 | Richards |
| 2016/0211577 A1 | 7/2016 | Miller et al. |

OTHER PUBLICATIONS

Hassett: "Phased Array Antenna Calibration Measurement Techniques and Methods"; found on the internet Jun. 22, 2020 at: https://www.nsi-mi.com/images/Technical_Papers/2016/EUCAP2016_KH_Phased_Array_Antenna_Calibration_Measurement.pdf; pp. 1-4.

* cited by examiner

ANTENNA SYSTEM WITH A BEAMFORMING DATA MODULATOR

RELATED APPLICATIONS

The present invention is a U.S. National Stage under 35 USC 371 patent application, claiming priority to Serial No. PCT/US2018/033444, filed on 18 May 2018; which claims priority from U.S. Provisional Application No. 62/507,948, filed 18 May 2017, both of which are incorporated herein by reference in their entirety.

TECHNICAL FIELD

This disclosure relates generally to communication systems, and more specifically to an antenna system with a beamforming data modulator.

BACKGROUND

An antenna array (or array antenna) is a set of multiple radiating elements that work together as a single antenna to transmit or receive radio waves. The individual radiating elements can be connected to a receiver and/or transmitter by circuitry that applies an appropriate amplitude and/or phase adjustment of signals received and/or transmitted by the radiating elements. When used for transmitting, the radio waves radiated by each individual radiating element combine and superpose with each other, adding together (interfering constructively) to enhance the power radiated in desired directions, and cancelling (interfering destructively) to reduce the power radiated in other directions. Similarly, when used for receiving, the separate received signals from the individual radiating elements are combined with the appropriate amplitude and/or phase relationship to enhance signals received from the desired directions and cancel signals from undesired directions.

SUMMARY

One example includes a phased array antenna system. The system includes a beamforming network configured to receive a beam signal at a beam signal port to generate a plurality of element signals with each element signal being generated at a respective one of a plurality of element signal ports, each element signal of the plurality of element signals being provided to a respective one of a plurality of antenna elements. The system also includes a plurality of modulation controllers, each associated with a respective one of the plurality of antenna elements. Each of the modulation controllers can generate a beam code in response to a beamforming signal and a data code in response to a data signal. The system further includes a plurality of element adjustment circuits, each associated with a respective one of the plurality of antenna elements. Each of the plurality of element adjustment circuits can modulate the beam code and the data code onto a respective one of the plurality of element signals to generate a respective adjusted element signal that is provided to a respective radiating element.

DETAILED DESCRIPTION

This disclosure relates generally to communication systems, and more specifically to an antenna system with a beamforming data modulator. An antenna system can be arranged as a phased array antenna system that includes a plurality of antenna elements. The antenna system can include a beam source that provides a beam signal to a beamforming network. The beamforming network can distribute a respective element signal to each of the antenna elements based on the beam signal. Each of the antenna elements can include a modulation controller that can be configured to modulate the respective element signal. As an example, the modulation controller can include a beam modulator that can be configured to generate a beam code in response to a beamforming signal that defines a relative amplitude and/or phase relationship of the respective adjusted element signal that is to be transmitted from the antenna element via a respective radiating element. The modulation controller can also include a data modulator that is configured to generate a data code in response to a data signal that is provided to each of the antenna elements. The antenna element can include an element adjustment circuit that modulates the beam code and the data code onto the respective element signal to generate the adjusted element signal that is transmitted from the respective antenna element via the radiating element.

For example, the modulation controller can include logic (e.g., a set of AND-gates) that is configured to combine the data code and the beam code. As an example, the beam code can include a phase portion and/or an amplitude portion, and the data code can also include a phase portion and/or an amplitude portion (e.g., be provided as a phase-shift keying (PSK) code, an amplitude phase-shift keying (APSK) code, etc.), such that the data code can be combined with some or all of at least one of the phase portion and the amplitude portion of the beam code. The combined beam code and data code can thus be provided to at least one digital-to-analog converter (DAC) of a respective element adjustment circuit of the respective antenna element. The DAC(s) can convert the combined beam code and data code into at least one respective analog signal that is modulated onto the element signal via circuitry of the element adjustment circuit (e.g., via at least one of a phase-shifter and a variable gain amplifier (VGA)). Therefore, the element adjustment circuit can generate the adjusted element signal that is provided to a radiating element for transmission.

Figure 1:
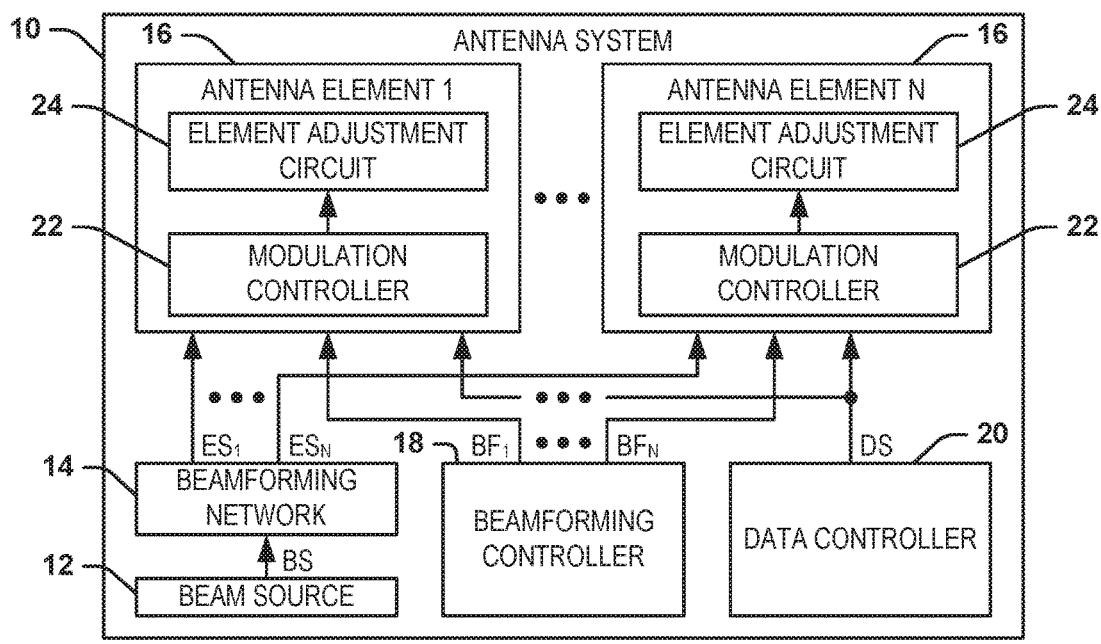
FIG. 1 illustrates an example of an antenna system.

FIG. 1 illustrates an example of an antenna system 10. The antenna system 10 can correspond to a phased array antenna system, or can correspond to a single reticle of an antenna system that includes multiple substantially identical reticles. The antenna system 10 can thus transmit a plurality of adjusted element signals to produce a beam in a desired direction (e.g., in any of a variety of angles between 0° and approximately 60°) that is based on a relative phase of the adjusted element signals, as described in greater detail herein.

The antenna system 10 includes a beam source 12 that is configured to generate a beam signal BS at an operating frequency (e.g., 30 GHz) of radiating elements of antenna elements 16. The beam signal BS may for example be based on a local oscillator configured to generate a reference signal at a predetermined frequency. As an example, the beam source 12 can be configured as a programmable synthesizer. The beam signal BS is provided to a beam signal port 15 of a beamforming network 14 that is configured to generate a plurality N of element signals ES, demonstrated in the example of FIG. 1 as element signals $ES_1$ through $ES_N$, where N is a positive integer, at a plurality of element signal ports 17. For example, the beamforming network 14 can be implemented as stages of divider circuits. The number of stages can vary from embodiment to embodiment. As an example, each divider circuit can be implemented as a power divider circuit, such as a Wilkinson power divider, a hybrid coupler, a directional coupler, or nearly any other circuit that can divide signals. As an example, N can be equal to sixty-four for a given reticle. The element signals ES are provided to a plurality N of antenna elements 16 that can be arranged in an array. As described in greater detail herein, the antenna elements 16 can each be configured to modulate a respective one of the element signals ES to generate a respective adjusted element signal via a radiating element in a phase-shifted and/or amplified manner relative to each other to implement beamforming.

In addition, the antenna system 10 includes a beamforming controller 18 configured to generate N beamforming signals $BF_1$ through $BF_N$. The beamforming signals BF can each correspond to a serial data signal that defines respective phase and/or amplitude information of a given one of the antenna elements 16 with respect to transmission of the respective adjusted element signal. Therefore, the beamforming signals BF can collectively define the beamforming information associated with the aggregate transmission of the adjusted element signals to provide a wavefront (or beam) in a predetermined or desired direction. As an example, the beamforming controller 18 can be implemented in hardware, for example, as one or more application specific integrated circuits (ASICs), custom field programmable gate array (FPGA) chips, in software, as machine executable instructions stored on a non-transitory medium and executed by an associated processor, or as a combination of hardware and software. The beamforming controller 18 can be configured to generate the beamforming signals BF in response to one or more commands from an antenna system controller (not shown) indicating a desired transmission direction of the wavefront of the adjusted element signals.

Furthermore, the antenna system 10 includes a data controller 20 that is configured to generate a data signal DS in response to one or more commands from the antenna system controller indicating the data to be transmitted by the antenna system 10. As an example, the data controller 20 can be implemented in hardware, for example, as one or more application specific integrated circuits (ASICS), custom field programmable gate array (FPGA) chips, in software, as machine executable instructions stored in a non-transitory medium and executed by an associated processor, or as a combination of hardware and software. In the example of FIG. 1, the data signal DS is demonstrated as being provided to each of the antenna elements 16. For example, the data signal DS can correspond to an information data signal that is to be modulated into the aggregate transmitted adjusted element signals. As an example, the data signal DS can be provided as a serial data stream that is concurrently provided to each of the antenna elements 16. As described in greater detail herein, the data signal DS is modulated into each of the element signals ES by the respective antenna elements 16. Therefore, the antenna elements 16 each modulate both the phase and/or amplitude information associated with the beamforming signals BF and the data information associated with the data signal DS into the respective element signals ES to generate the respective adjusted element signals for transmission via the respective radiating elements of the antenna elements 16.

In the example of FIG. 1, the antenna elements 16 each include a modulation controller 22, an element adjustment circuit 24, and a radiating element (not shown). The modulation controller 22 is configured to generate a beam code in response to the respective one of the beamforming signals BF, and to generate a data code in response to the data signal DS. For example, the beam code can include a phase portion associated with the relative phase of the respective resultant adjusted element signal and an amplitude portion associated with the relative amplitude of the respective resultant adjusted element signal. As another example, the data code can also include at least one of a phase portion and an amplitude portion. Thus, the modulation controller 22 can be configured to combine the beam code and the data code, such as the phase portion(s) and/or the amplitude portion(s). The element adjustment circuit 24 can thus modulate the combined beam code and data code onto the respective one of the element signals ES to generate the respective adjusted element signal for transmission. For example, the element adjustment circuit 24 can include at least one digital-to-analog converter (DAC) to convert the combined beam code and data code into an analog signal(s), and can include a phase-shifter and a variable gain amplifier (VGA) to adjust the phase and/or amplitude of the respective element signal ES based on the analog signal(s) to generate the respective adjusted element signal.

As an example, the antenna system 10 can separately provide the data signal DS and the beamforming signals BF on an as-needed basis. For example, the data signal DS may be used to modulate data onto the element signals at times when the direction of the beam is not being changed (i.e., the beamforming signals BF are temporarily static). Therefore, the modulation controller 22 of each of the antenna elements 16 can modulate the respective element signal ES based on the respective beamforming signal BF to establish a direction of the beam of the adjusted element signals based on the relative phase and/or amplitude information associated with the respective beamforming signal BF. The data controller 20 can then provide the data signal DS that can likewise be modulated onto the adjusted element signals. As an example, the data signal DS, and thus the resultant data code, is applied to each of the antenna elements 16 uniformly. In other words, the same data is provided to each of the antenna elements 16. As a result, the direction of the beam of the adjusted element signals, as provided by the respective beamforming signals BF, is unaffected by the inclusion of the data signal DS modulated onto the respective adjusted element signals. Accordingly, the transmitted beam that includes the collective adjusted element signals can include the data signal DS modulated thereon.

By implementing the modulation of the data signal DS into each of the element signals ES, along with the beamforming signals BF, the antenna system 10 can be fabricated in a much more simplistic manner. For example, typical antenna systems modulate data at baseband using a baseband modulator, which is then upconverted and provided as a modulated beam signal to the beamforming network. In contrast, in embodiments described herein, the data signal is modulated as a data code onto the beam code in a manner that implements nothing more than simple logic gates, with the combined beam code and data code being modulated onto the element signals using element adjustment circuits that are also used for beamforming purposes. As such, the element adjustment circuits that can be used for beamforming do not require any additional hardware to also provide the data modulation described herein. Accordingly, the antenna system 10 can provide for a more simplified and efficient modulation scheme to provide modulated data that is transmitted from a phased array antenna system.

Figure 2:
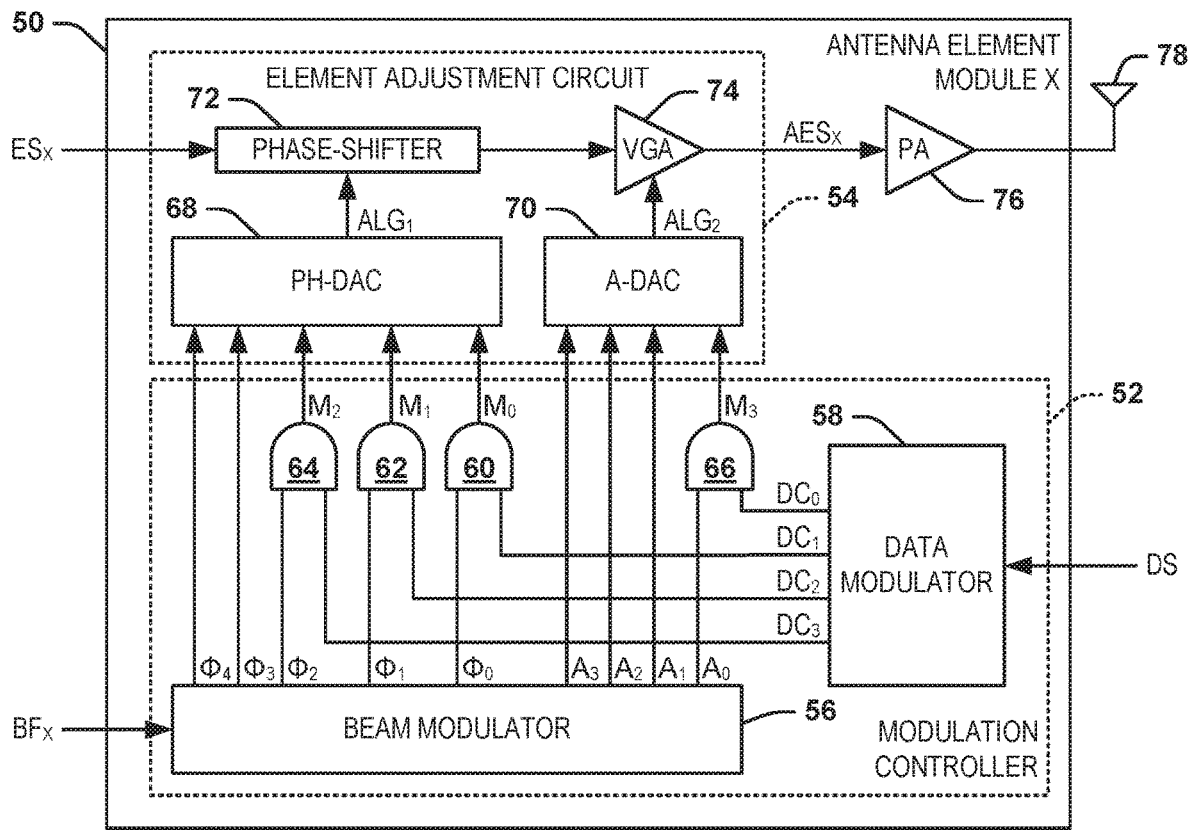
FIG. 2 illustrates an example of an antenna element.

FIG. 2 illustrates an example of an antenna element 50. The antenna element 50 can correspond to one of the antenna elements 16 in the example of FIG. 1. Particularly, the antenna element 50 is demonstrated in the example of FIG. 2 as "ANTENNA ELEMENT X", where X corresponds to a given one of the N antenna elements 16. Therefore, reference is to be made to the example of FIG. 1 in the following example of FIG. 2.

The antenna element 50 includes a modulation controller 52 that is configured to generate and combine the beam code and the data code from the respective beamforming signal $BF_X$ and the data signal DS. The antenna element 50 also includes an element adjustment circuit 54 that is configured to modulate a respective one of the element signals, demonstrated in the example of FIG. 2 as $ES_X$, based on the combined beam code and data code to generate a respective adjusted element signal, demonstrated in the example of FIG. 2 as $AES_X$.

The modulation controller 52 receives a beamforming signal $BF_X$ that corresponds to one of the beamforming signals BF in the example of FIG. 1, and also receives the data signal DS. The beamforming signal $BF_X$ is provided to a beam modulator 56 that is configured to generate a beam code. As an example, the beam modulator 56 can be configured as a serial peripheral interface (SPI) that is configured to convert the beamforming signal $BF_X$ from a serial signal stream to the multi-bit beam code. In the example of FIG. 2, the beam code is demonstrated as having a phase portion $\Phi$, demonstrated as having five bits $\Phi_0$ through $\Phi_4$, and an amplitude portion A, demonstrated as having four bits $A_0$ through $A_3$. In other embodiments, the number of bits for the phase portion $\Phi$ and/or amplitude portion A may be different than is shown in FIG. 2. The phase portion $\Phi$ thus corresponds to the phase information associated with the beamforming signal $BF_X$, and thus the desired phase of the resultant respective adjusted element signal in order to produce a beam in the desired direction. Similarly, the amplitude portion A thus corresponds to the amplitude information associated with the beamforming signal $BF_X$, and thus the desired amplitude of the resultant respective adjusted element signal $AES_X$ in order to produce the beam in the desired direction.

The data signal DS is provided to a data modulator 58 that is configured to generate the data code based on the data signal DS. Similar to as described previously regarding the beam modulator 56, the data modulator 58 can be implemented as an SPI interface for example to convert the data signal DS from a serial signal stream to the multi-bit data code. As an example, the data code DC can correspond to a phase-shift keying (PSK) code, such as demonstrated in the example of FIG. 3.

Figure 3:
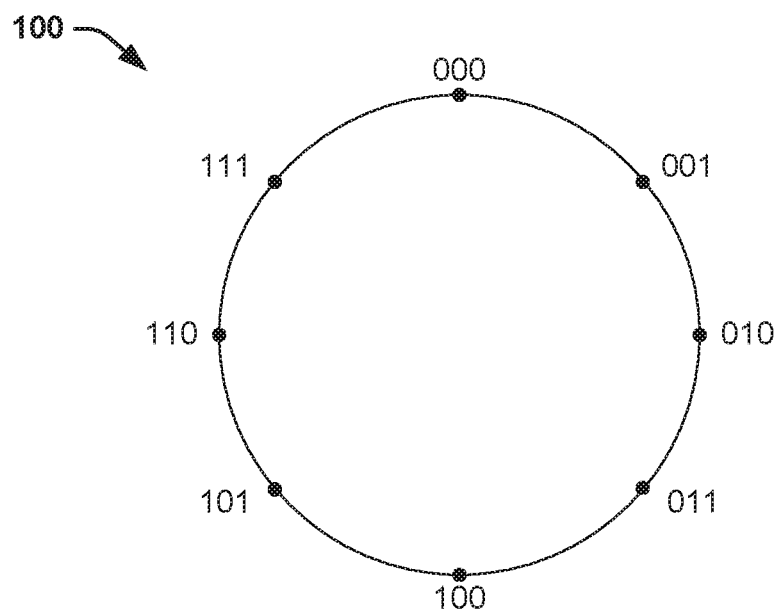
FIG. 3 illustrates an example of a PSK modulation scheme.

FIG. 3 illustrates an example diagram 100 of a PSK modulation scheme. The diagram 100 demonstrates a circle with eight separate states arranged in 45° intervals about a constellation, as defined by a three-bit code, and thus demonstrates an 8-PSK code. Therefore, the three bits of the data code can correspond to the angle of the data code about the constellation. However, as an example, fewer or additional PSK modulation codes can be implemented by the data modulator 58.

While data code could be arranged as a three-bit PSK code, in the example of FIG. 2, the data code is demonstrated as four bits $DC_0$ through $DC_3$. The bits $DC_1$ through $DC_3$ can correspond to a phase portion, and can thus form an 8-PSK code, as demonstrated in the example of FIG. 3. However, in the example of FIG. 2, the data code is demonstrated as including the bit $DC_0$ corresponding to an amplitude portion. Therefore, the data code can correspond to an amplitude phase-shift keying (APSK) code, such as demonstrated in the example of FIG. 4.

Figure 4:
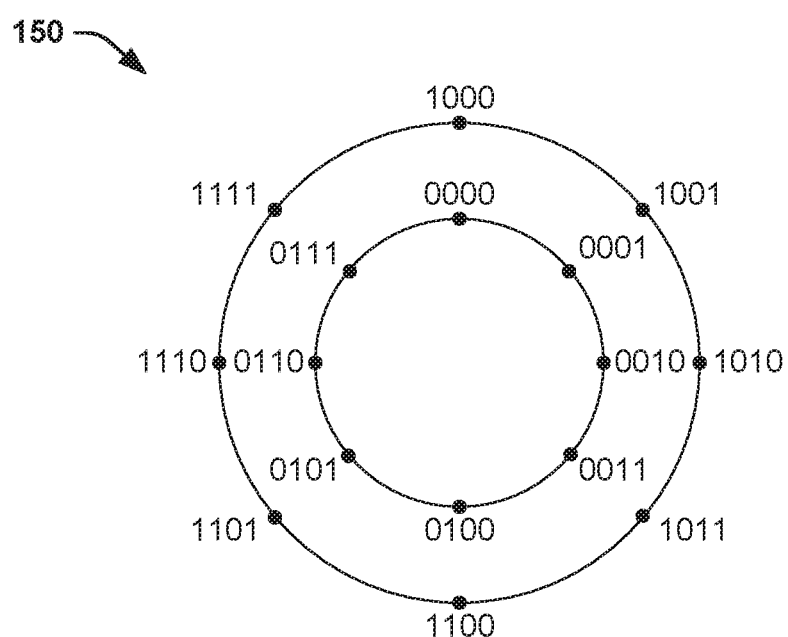
FIG. 4 illustrates an example of an APSK modulation scheme.

FIG. 4 illustrates an example diagram 150 of an APSK modulation scheme. The diagram 150 demonstrates two concentric circles, each with eight separate states arranged in 45° intervals about a constellation. The diagram 150 thus demonstrates a 16-APSK code, as defined by a four-bit code. In the example of FIG. 4, the most significant bit determines a distance from center of the code, and thus the three additional bits dictate the angle of the code in the constellation. However, as an example, fewer or additional APSK modulation codes can be implemented by the data modulator 58. Referring back to the example of FIG. 2, as described herein, the phase portion $DC_1$ through $DC_3$ of the data code is combined with the phase portion $\Phi$ of the beam code, and the amplitude portion $DC_0$ of the data code is combined with the amplitude portion A of the beam code.

In the example of FIG. 2, the modulation controller 52 includes logic, demonstrated as a set of AND-gates, configured to combine the beam code and the data code. Particularly, the example of FIG. 2 demonstrates that the modulation controller 52 includes a first AND-gate 60, a second AND-gate 62, a third AND-gate 64, and a fourth AND-gate 66. The first AND-gate 60 is configured to perform a logic-AND operation on the bit $DC_1$ of the data code and the bit $\Phi_0$ of the phase code to provide a bit $M_0$. Similarly, the second AND-gate 62 is configured to perform a logic-AND operation on the bit $DC_2$ of the data code and the bit $\Phi_1$ of the phase code to provide a bit $M_1$. Additionally, the third AND-gate 64 is configured to perform a logic-AND operation on the bit $DC_3$ of the data code and the bit $\Phi_2$ of the phase code to provide a bit $M_2$. Furthermore, the fourth AND-gate 66 is configured to perform a logic-AND operation on the bit $DC_0$ of the data code and the bit $A_0$ of the phase code to provide a bit $M_3$. Therefore, the AND-gates 60, 62, 64, and 66 are configured to generate a combination code that corresponds to a logic-AND combination of the phase code and the data code.

The element adjustment circuit 54 includes at least one DAC. In the example of FIG. 2, the at least one DAC includes a first DAC 68, demonstrated as "PH-DAC", and a second DAC 70, demonstrated as "PH-DAC". The first DAC 68 is configured to convert the combined phase portion of the data code DC and phase portion $\Phi$ of the beam code into a first analog signal $ALG_1$. In the example of FIG. 2, the first DAC 68 is configured to convert the combined code of $M_0$, $M_1$, $M_2$, $\Phi_3$, and $\Phi_4$ into the first analog signal $ALG_1$. Therefore, the first analog signal $ALG_1$ can include the phase portion of each of the data code and the beam code. Similarly, the second DAC 70 is configured to convert the combined amplitude portion of the data code DC and amplitude portion A of the beam code into a second analog signal $ALG_2$. In the example of FIG. 2, the second DAC 70 is configured to convert the combined code of $M_3$, $A_1$, $A_2$, and $A_3$ into the second analog signal $ALG_2$. Therefore, the second analog signal $ALG_2$ can include the amplitude portion of each of the data code and the beam code.

In the example of FIG. 2, the first analog signal $ALG_1$ is provided to a phase-shifter 72 and the second analog signal $ALG_2$ is provided to a variable gain amplifier (VGA) 74 that each form part of the element adjustment circuit 54. The phase-shifter 72 and the VGA 74 are therefore configured to modulate the respective element signal $ES_X$ based on the first and second analog signals $ALG_1$ and $ALG_2$. As an example, the phase-shifter 72 can be configured as a vector modulator, such that the phase-shifter 72 can provide a phase-shift of the respective element signal $ES_X$ based on the phase information associated with the combination of the phase portions of the beam code and the data code. The VGA 74 can likewise provide amplification of the respective phase-shifted element signal $ES_X$ based on the amplitude information associated with the combination of the amplitude portions of the beam code and the data code to generate the respective adjusted element signal $AES_X$. Accordingly, the adjusted element signal $AES_X$ can include the APSK code (e.g., described in the example of FIG. 4) modulated thereon.

The adjusted element signal $AES_X$ is thus provided from the element adjustment circuit 54 to a power amplifier (PA) 76, and can thus be transmitted from the antenna element 50 via a radiating element 78. As a result, the respective adjusted element signal $AES_X$ can be transmitted along with the remaining adjusted element signals AES from the respective other antenna elements 50 in a relatively phase-shifted manner that defines a transmission direction of the aggregate beam. Accordingly, the aggregate beam can propagate the data signal DS modulated onto the aggregate beam (e.g., via the respective adjusted element signals AES) in a direction that is based on the respective beamforming signals BF.

Figure 5:
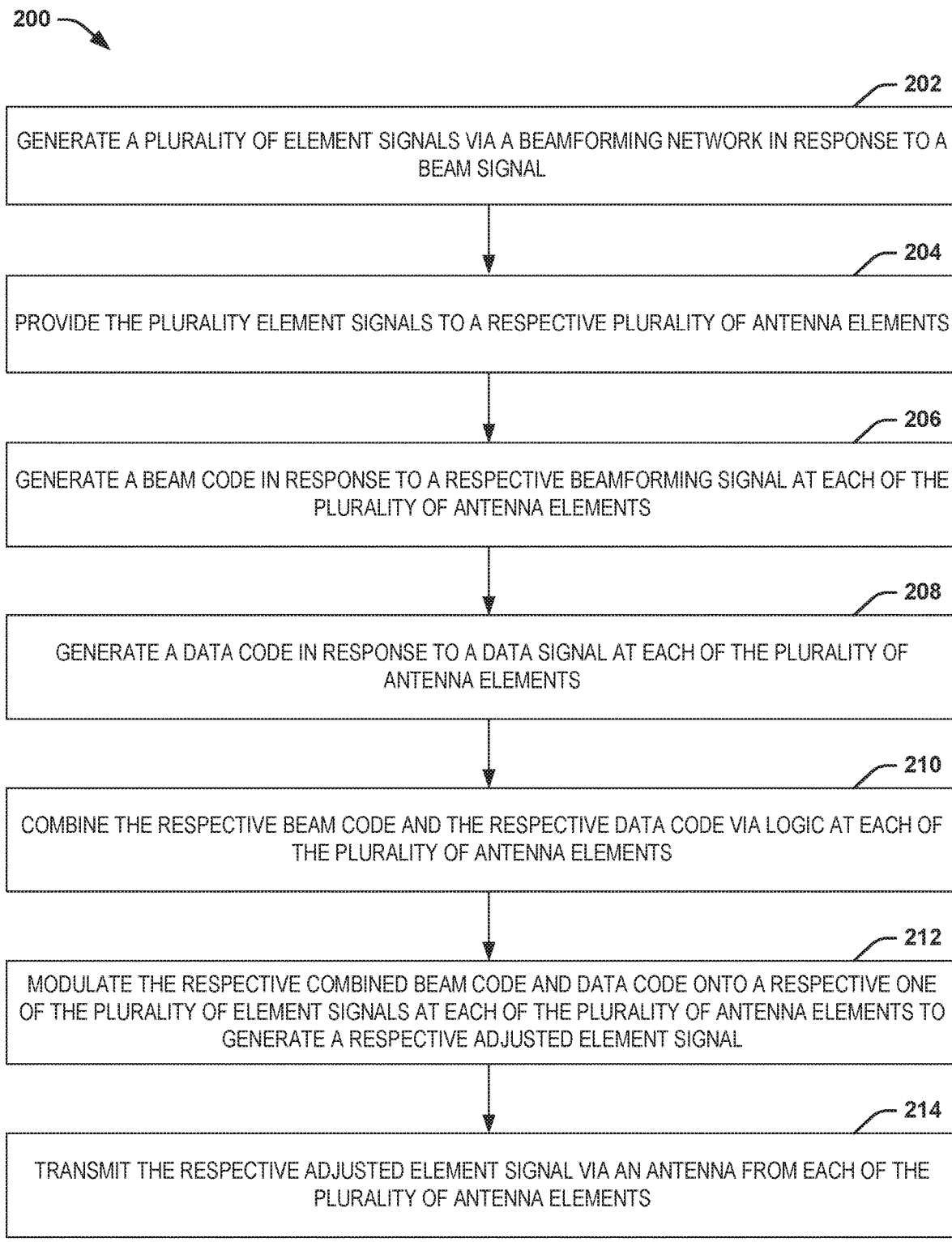
FIG. 5 illustrates an example of a method for generating an adjusted element signal via an antenna element for transmission from the antenna element.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 5 illustrates an example of a method 200 for generating an adjusted element signal (e.g., the adjusted element signal $AES_X$) via an antenna element (e.g., the antenna element 16) for transmission from the antenna element. At 202 a plurality of element signals (e.g., the element signals ES) are generated via a beamforming network (e.g., the beamforming network 14) in response to a beam signal (e.g., the beam signal BS). At 204, the plurality element signals are provided to the respective plurality of antenna elements. At 206, a beam code (e.g., Φ and A) is generated in response to a respective beamforming signal (e.g., the beamforming signal $BF_X$) at each of the plurality of antenna elements. At 208, a data code (e.g., the data code DC) is generated in response to a data signal (e.g., the data signal DS) at each of the plurality of antenna elements. At 210, the respective beam code and the respective data code are combined via logic (e.g., the AND-gates 60, 62, 64, and 66) is combined at each of the plurality antenna elements. At 212, the respective combined beam code and data code is modulated onto a respective one of the plurality of element signals at each of the respective plurality of antenna elements to generate a respective adjusted element signal. At 214, the respective adjusted element signal is transmitted via a radiating element (e.g., the radiating element 78) at each of the plurality of antenna elements.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A phased array antenna system comprising:
    a beamforming network configured to receive a beam signal at a beam signal port to generate a plurality of element signals with each element signal being generated at a respective one of a plurality of element signal ports, each element signal of the plurality of element signals being provided to a respective one of a plurality of antenna elements;
    a plurality of modulation controllers, each modulation controller of the plurality of modulation controllers being associated with a respective one of the plurality of antenna elements, each of the plurality of modulation controllers being configured to generate a beam code in response to a beamforming signal and a data code in response to a data signal, each of the plurality of modulation controllers being configured to combine the beam code and the data code to generate a phase portion and an amplitude portion; and
    a plurality of element adjustment circuits, each element adjustment circuit of the plurality of element adjustment circuits being associated with a respective one of the plurality of antenna elements, each of the plurality of element adjustment circuits being configured to generate a first analog signal associated with the phase portion and a second analog signal associated with the amplitude portion, and to modulate the first analog signal and the second analog signal onto a respective one of the plurality of element signals to generate a respective adjusted element signal that is provided to a respective radiating element.

2. The system of claim 1, wherein each of the plurality of modulation controllers comprises logic configured to combine the data code with at least a portion of the beam code, and wherein each of the plurality of element adjustment circuits comprises a phase digital-to-analog converter (DAC) configured to generate the first analog signal and an amplitude DAC configured to generate the second analog signal.

3. The system of claim 2, wherein the data code corresponds to a phase-shift keying (PSK) code that is combined with the at least a portion of the beam code.

4. The system of claim 1, wherein the beam code comprises a phase portion and an amplitude portion, wherein each of the plurality of element adjustment circuits comprises:
- a phase digital-to-analog converter (DAC) configured to convert the phase portion of the beam code to the first analog signal;
- an amplitude DAC configured to convert the amplitude portion of the beam code to the second analog signal;
- a phase-shifter configured to phase-shift the respective element signal in response to the first analog signal; and
- a variable gain amplifier configured to amplify the respective phase-shifted element signal in response to the second analog signal to generate the respective adjusted element signal.

5. The system of claim 4, wherein each of the plurality of modulation controllers is configured to generate the data code as a phase-shift keying (PSK) code that is modulated onto the phase portion of the beam code, such that the phase DAC is configured to generate the first analog signal as comprising the phase portion of the beam code and the data code.

6. The system of claim 4, wherein each of the plurality of modulation controllers is configured to generate the data code as an amplitude phase-shift keying (APSK) code comprising a phase portion that is modulated onto the phase portion of the beam code and an amplitude portion that is modulated onto the amplitude portion of the beam code, such that the phase DAC is configured to generate the first analog signal as comprising the respective phase portions of the beam code and the data code and the amplitude DAC is configured to generate the second analog signal as comprising the respective amplitude portions of the beam code and the data code.

7. The system of claim 6, wherein the APSK code comprises a three-bit phase portion and a one-bit amplitude portion, such that the APSK code is a 16-APSK modulation code.

8. The system of claim 4, wherein each of the plurality of modulation controllers further comprises logic AND-gates configured to perform a logic AND operation on the data code and at least one of a subset of the phase portion of the beam code and a subset of the amplitude portion of the beam code to combine the data code with at least a portion of the beam code.

9. The system of claim 1, wherein the antenna system comprises a synthesizer configured to generate the beam signal in response to an oscillator signal having a predetermined frequency.

10. The system of claim 1, wherein the antenna system further comprises a data interface configured to generate the data signal and provide the data signal to each of the plurality of antenna elements.

11. The system of claim 1, wherein the antenna system further comprises a beamforming controller configured to generate a plurality of beamforming signals associated with each of the plurality of antenna elements, wherein the plurality of beamforming signals collectively define a transmission direction of a wavefront of a plurality of adjusted element signals communicated from each of the respective plurality of antenna elements.

12. The system of claim 1, wherein the each of the plurality of element adjustment circuits is configured to perform a logic-AND operation on at least a portion of the beam code and at least a portion of the data code to generate the phase portion and the amplitude portion.

13. The system of claim 1, wherein each of the plurality of element adjustment circuits is configured to modulate the first analog signal onto the respective one of the plurality of element signals to generate a phase-shifted element signal, and to modulate the second analog signal onto the respective phase-shifted element signal to generate the respective adjusted element signal.

14. A method for generating an adjusted element signal via an antenna element for transmission from the antenna element, the method comprising:
- generating a plurality of element signals via a beamforming network in response to a beam signal;
- providing the plurality element signals to a respective plurality of antenna elements;
- generating a beam code in response to a respective beamforming signal at each of the plurality of antenna elements;
- generating a data code in response to a data signal at each of the plurality of antenna elements;
- combining the respective beam code and the respective data code via logic at each of the plurality of antenna elements to generate a phase portion and an amplitude portion;
- converting the phase portion to a first analog signal and converting the amplitude portion to a second analog signal;
- modulating the respective first analog signal and second analog signal onto a respective one of the plurality of element signals at each of the plurality of antenna elements to generate a respective adjusted element signal; and
- transmitting the respective adjusted element signal via a radiating element from each of the plurality of antenna elements.

15. The method of claim 14, further comprising generating the first analog signal via a phase digital-to-analog converter (DAC) and generating the second analog signal via an amplitude DAC.

16. The method of claim 14, wherein the data code corresponds to a phase-shift keying (PSK) code, wherein combining the beam code and the data code comprises combining the PSK code with the at least a portion of the beam code.

17. The method of claim 14, wherein modulating the respective first analog signal and second analog signal comprises:
- phase-shifting the respective element signal in response to the first analog signal; and
- amplifying the respective phase-shifted element signal in response to the second analog signal to generate the respective adjusted element signal.

18. The method of claim 14, wherein generating the data code comprises generating the data code as a phase-shift keying (PSK) code, wherein combining the respective beam code and the respective data code comprises combining a phase portion of the PSK code with a phase portion of the beam code and combining an amplitude portion of the PSK with an amplitude portion of the beam code.

19. The system of claim 14, wherein generating the data code comprises generating the data code as an amplitude phase-shift keying (APSK) code comprising a phase portion and an amplitude portion, wherein combining the respective beam code and the respective data code comprises:
- combining the phase portion of the APSK code with a phase portion of the beam code; and
- combining the amplitude portion of the APSK code with an amplitude portion of the beam code.

20. The method of claim 19, wherein the APSK code comprises a three-bit phase portion and a one-bit amplitude portion, such that the APSK code is a 16-APSK modulation code.

21. The method of claim 14, wherein combining the beam code and the data code comprises performing a logic AND operation on the data code and at least one of a subset of a phase portion of the beam code and a subset of an amplitude portion of the beam code to combine the data code with at least a portion of the beam code.

22. The method of claim 14, wherein generating the beam signal comprises generating the beam signal via a synthesizer configured to generate the beam signal in response to an oscillator signal having a predetermined frequency.

23. The method of claim 14, wherein combining the respective beam code and the respective data code comprises performing a logic-AND operation on at least a portion of the beam code and at least a portion of the data code to generate the phase portion and the amplitude portion.

24. The method of claim 14, wherein modulating the respective first analog signal and second analog signal comprises:

modulating the first analog signal onto the respective one of the plurality of element signals to generate a phase-shifted element signal; and modulating the second analog signal onto the respective phase-shifted element signal to generate the respective adjusted element signal.

\* \* \* \* \*